(12) United States Patent
Harper et al.

(10) Patent No.: US 9,110,867 B2
(45) Date of Patent: *Aug. 18, 2015

(54) PROVIDING APPLICATION BASED MONITORING AND RECOVERY FOR A HYPERVISOR OF AN HA CLUSTER

(75) Inventors: Richard E. Harper, Chapel Hill, NC (US); Marcel Mittelstaedt, Stuttgart (DE); Markus Mueller, Eutingen (DE); Lisa F. Spainhower, Highland, NY (US)

(73) Assignee: International Business Machines Corporation, Armonk, NY (US)

( * ) Notice: Subject to any disclaimer, the term of this patent is extended or adjusted under 35 U.S.C. 154(b) by 152 days.

This patent is subject to a terminal disclaimer.

(21) Appl. No.: 13/589,390

(22) Filed: Aug. 20, 2012

(65) Prior Publication Data

US 2013/0275805 A1 Oct. 17, 2013

Related U.S. Application Data

(63) Continuation of application No. 13/444,997, filed on Apr. 12, 2012.

(51) Int. Cl.
*G06F 11/00* (2006.01)
*G06F 11/20* (2006.01)
*G06F 11/14* (2006.01)

(52) U.S. Cl.
CPC ........ *G06F 11/2035* (2013.01); *G06F 11/1438* (2013.01); *G06F 11/1484* (2013.01)

(58) Field of Classification Search
CPC . G06F 11/20; G06F 11/2025; G06F 11/2046; G06F 11/203; G06F 11/2028; G06F 11/1484
USPC .................................................. 714/10, 4.11
See application file for complete search history.

(56) References Cited

U.S. PATENT DOCUMENTS

| 7,886,183 B2 | 2/2011 | Krishnan et al. |
| 7,992,032 B2 | 8/2011 | Baba et al. |

(Continued)

FOREIGN PATENT DOCUMENTS

JP 2005202652 A 7/2005

OTHER PUBLICATIONS

"High Availability Add-On," Red Hat, Inc., http://www.redhat.com/rhel/add-ons/high_availability.html, accessed Aug. 19, 2011, 2 pages.

(Continued)

*Primary Examiner* — Philip Guyton
(74) *Attorney, Agent, or Firm* — Yee & Associates, P.C.; Jeffrey S. LaBaw (57) ABSTRACT

An embodiment of the invention is directed to a method associated with a node comprising a hypervisor and guest VMs, each guest VM being managed by the hypervisor and disposed to run applications, the node being joined with other nodes to form an HA cluster. The method includes establishing an internal bidirectional communication channel between each guest VM and the hypervisor, and further includes sending commands and responses thereto through the channel, wherein respective commands manage a specified application running on the given guest VM. The messages are selectively monitored, to detect a failure condition associated with the specified application running on the given guest VM. Responsive to detecting a failure condition, action is taken to correct the failure condition, wherein the action includes sending at least one command through the internal channel from the hypervisor to the given guest VM.

31 Claims, 4 Drawing Sheets

(56) References Cited

U.S. PATENT DOCUMENTS

| | | | |
|---|---|---|---|
| 8,015,431 B2 | 9/2011 | Baba et al. | |
| 8,024,600 B2 | 9/2011 | Sciacca | |
| 8,032,780 B2 | 10/2011 | Koh et al. | |
| 8,055,933 B2 | 11/2011 | Jaehde et al. | |
| 8,117,495 B2 * | 2/2012 | Graham et al. | 714/11 |
| 8,171,349 B2 * | 5/2012 | Stern et al. | 714/47.1 |
| 2005/0132379 A1 | 6/2005 | Sankaran et al. | |
| 2008/0189468 A1 * | 8/2008 | Schmidt et al. | 711/6 |
| 2008/0307259 A1 * | 12/2008 | Vasudevan et al. | 714/23 |
| 2009/0070623 A1 | 3/2009 | Sciacca | |
| 2009/0070761 A1 * | 3/2009 | Zhao | 718/1 |
| 2010/0017643 A1 | 1/2010 | Baba et al. | |
| 2010/0077250 A1 * | 3/2010 | Koh et al. | 714/4 |
| 2010/0211829 A1 | 8/2010 | Ziskind et al. | |
| 2010/0241896 A1 | 9/2010 | Brown et al. | |
| 2011/0022882 A1 | 1/2011 | Jaehde et al. | |
| 2011/0191627 A1 * | 8/2011 | Koning et al. | 714/5.1 |
| 2013/0007506 A1 * | 1/2013 | Jain et al. | 714/4.12 |
| 2013/0275805 A1 * | 10/2013 | Harper et al. | 714/16 |
| 2013/0275966 A1 * | 10/2013 | Harper et al. | 718/1 |

OTHER PUBLICATIONS

Vanover, "With Hyper-V's Clustering and Storage, Who Needs HA?", Tech Target, http://searchservervirtualization.techtarget.com/tip/With-Hyper-Vs-clustering-and-storage-who-needs-HA, accessed Aug. 19, 2011, 13 pages.

Harper et al., "Providing Application Based Monitoring and Recovery for a Hypervisor of an HA Cluster", U.S. Appl. No. 13/444,997, filed Apr. 12, 2012, 29 pages.

Office Action, dated Mar. 12, 2014, regarding U.S. Appl. No. 13/444,997, 21 pages.

Final Office Action, dated Jul. 11, 2014, regarding U.S. Appl. No. 13/444,997, 17 pages.

* cited by examiner

PROVIDING APPLICATION BASED MONITORING AND RECOVERY FOR A HYPERVISOR OF AN HA CLUSTER

This application is a continuation of and claims the benefit of priority to U.S. patent application Ser. No. 13/444,997, filed on Apr. 12, 2012 and entitled "Providing Application Based Monitoring and Recovery for a Hypervisor of an HA Cluster". The contents of which are hereby incorporated by reference.

BACKGROUND

1. Field of the Invention

The invention disclosed and claimed herein generally pertains to a method and apparatus wherein a hypervisor is linked to one or more other hypervisors to form a high availability (HA) cluster. More particularly, the invention pertains to a method and apparatus of the above type wherein each hypervisor may enable multiple guest operating systems, or guest virtual machines (VMs), to run concurrently on a host computing platform.

2. Description of the Related Art

Certain virtualization management products maintain the availability of guest VMs by including or embedding an HA cluster product in their product offerings. Typically, these products work by forming the underlying hypervisors, which each runs on a physical machine, into a high availability cluster. Heartbeating is then performed between the hypervisors. When a member of the cluster fails the heartbeat, either due to hypervisor failure or physical server failure, embedded HA clustering technology restarts the guest VMs on alternate servers, thus maintaining their availability.

This approach has several limitations. For example, it does not detect and recover from the failure of the guest VM systems themselves, beyond a full crash of the guest's operating systems. Such approach only detects and recovers from the failure of the underlying hypervisor and its physical server. Neither does it detect and recover from the failure of applications running inside the guest VMs. Thus, applications can fail while running within a guest VM, without the hypervisor based cluster taking any notice. In this case, the guest is still up, but it doesn't give service. This places a significant limitation on the achievable availability of virtualized systems, since failures are frequently due to operating system problems, and application crashes and hangs. Moreover, more complex critical business applications require operations on the application level to take advantage of certain built-in data replication technology. Without any visibility into the guest VM, it is not possible to invoke these operations and take advantage of the built in features.

In addition, users who wish to take advantage of both the HA features at the hypervisor level and within the guest VM typically must become expert in, and must install, both hypervisor level and application level HA managers. At the same time, such users must ensure that policies that express relationship between resources and ensure that, for example, filesystems are mounted where the application is started or the receiver of a data replication pair is started on another physical system as the sender, are maintained by both the hypervisor level and application level HA systems. However, this level of complexity management is generally beyond the capabilities of most users.

SUMMARY

Embodiments of the invention can take the form of a method, a computer program product or an apparatus, selectively. An embodiment directed to a method is associated with a first node comprising a hypervisor and one or more guest virtual machines (VMs), wherein each guest VM is disposed to run one or more applications, and the first node is joined with one or more other nodes to form a high availability (HA) cluster. The method includes the step of establishing an internal bidirectional communication channel between each guest VM and the hypervisor of the first node. The method further includes sending messages that include commands and responses to commands through the internal channel, between the hypervisor and a given guest VM, wherein respective commands are sent to manage a specified application running on the given guest VM. The messages are selectively monitored, to detect an occurrence of a failure condition associated with the specified application running on the given guest VM. Responsive to detecting a failure condition, action is taken to correct the failure condition, wherein the action includes sending at least one command through the internal channel from the hypervisor to the given guest VM.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1A:
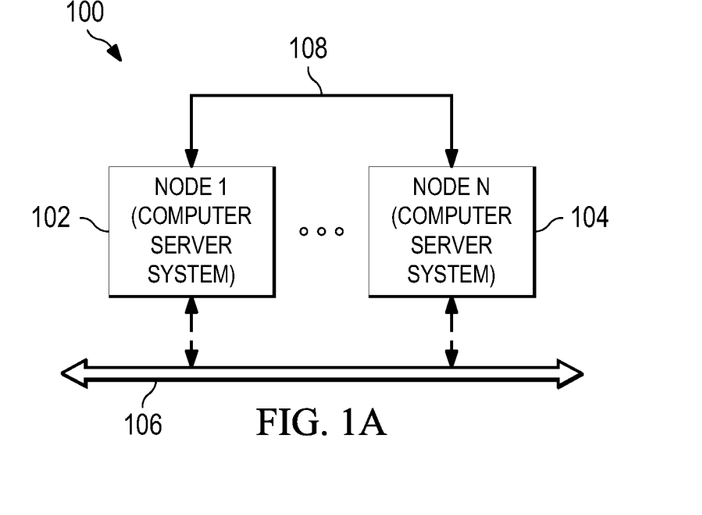
FIGS. 1A and 1B are block diagrams that each depicts an HA cluster of nodes, in which an illustrative embodiment of the invention is implemented.

Referring to FIG. 1A, there is shown a high availability (HA) computer cluster 100, which comprises multiple nodes exemplified by nodes 102 and 104. Nodes 102 and 104 are also referenced as node 1 and node N, respectively, where N is the total number of nodes. Usefully, N is two, but cluster 100 is not limited thereto. Respective nodes are joined together to form the cluster by means of a bus 106 or the like.

Each of the nodes comprises a computer server system which is constructed or configured in accordance with an embodiment of the invention, as described hereinafter in connection with FIG. 2. More particularly, each node includes a hypervisor and a hardware platform, for running applications and multiple guest operating systems, which are referred to herein as guest virtual machines (VMs).

Referring further to FIG. 1A, there is shown a cable 108 provided to interconnect each hypervisor of the nodes of cluster 100, and to carry heartbeat pulses or messages therebetween. If an application is running on a given one of the nodes, and the other node detects an alteration or failure of heartbeats sent from the given node, the other node will recognize that a failure has occurred in the hypervisor, or in the physical server of the given node. The other node may then be started to implement failover, to run the application from a guest VM managed by the hypervisor of the other node.

Cluster 100 is a peer to peer arrangement, since the cluster is not provided with a central manager to direct or control failover between different nodes. Instead, failover is implemented by the nodes themselves.

Figure 1B:
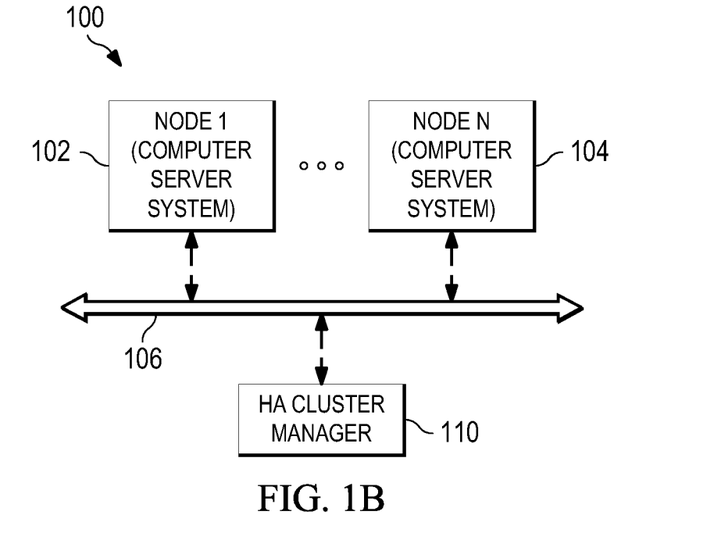

Referring to FIG. 1B, there are again shown nodes 102 and 104 joined together to form a cluster, by means of bus 106. However, instead of heartbeat cable 108, the cluster of FIG. 1B is provided with an HA cluster manager 110. When an application is running on a given one of the nodes, heartbeats sent from the given node are monitored by manager 110. Upon detecting a failure indicated by the heartbeats, manager 110 could implement failover to run the application on the other node.

Figure 2:
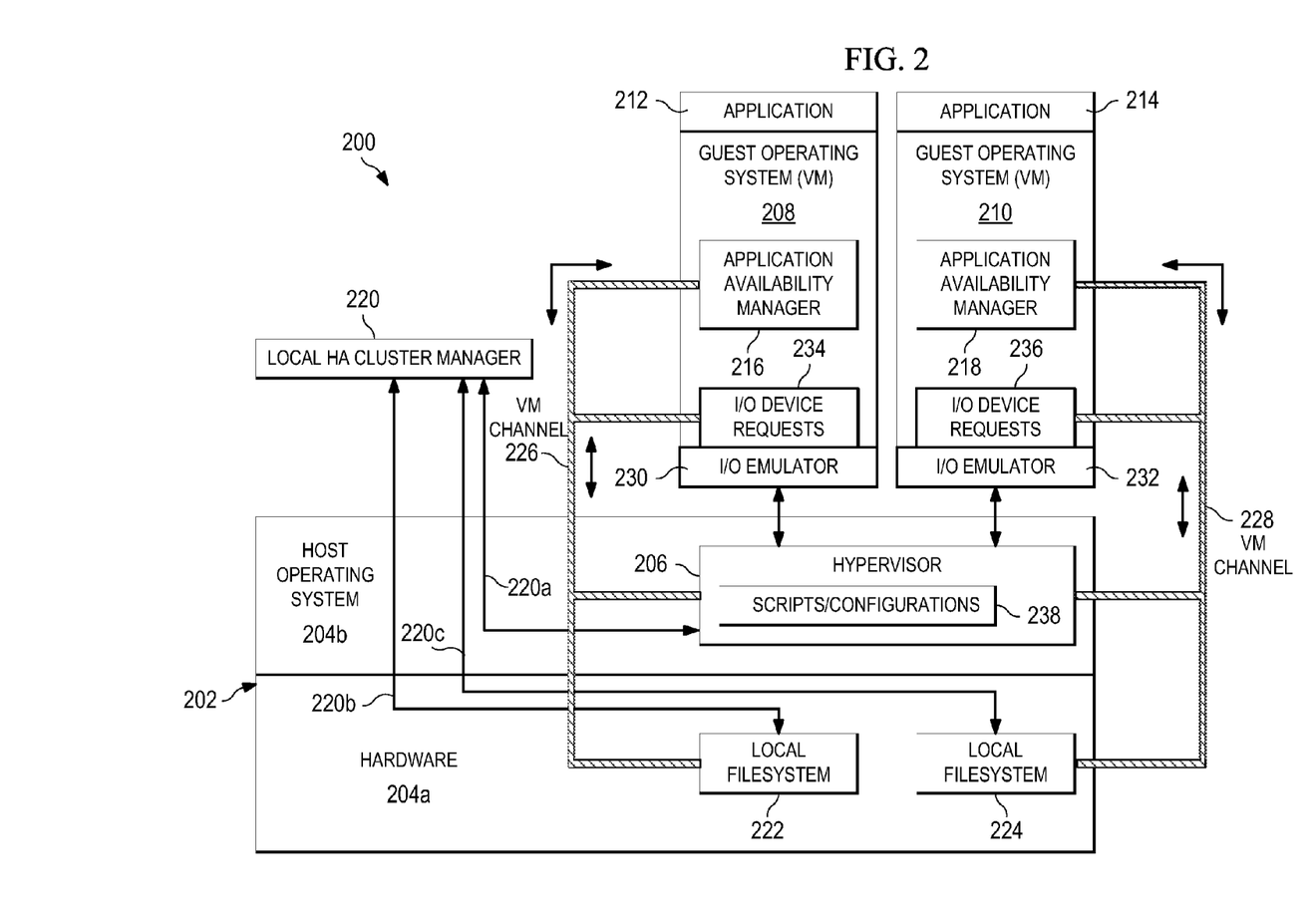
FIG. 2 is a schematic view illustrating a node for the node cluster of FIG. 1A or FIG. 1B.

Referring to FIG. 2, there is shown a node 200, which may be used as either of the nodes 102 or 104 of FIG. 1A and FIG. 1B. Node 200 has a computing platform 202, which comprises a hardware component 204a and an operating system 204b that includes a hypervisor 206. Hardware component 204a and host 204b operate to provide guest operating systems, or virtual machines (VMs) 208 and 210, which are managed by hypervisor 206. The guest VMs 208 and 210 are able to run respective applications 212 and 214, and are provided with application availability managers 216 and 218 for controlling and monitoring such applications.

FIG. 2 further shows a local HA cluster manager 220, which manages hypervisor 206, over a bidirectional communication path such as link 220a. As described hereinafter in further detail, HA cluster manager 220 is provided to implement failovers that involve node 200. For example, if an application is running on a guest VM, and hypervisor 206 notifies cluster manager 220 of a detected failure, HA cluster manager 220 could direct hypervisor 206 to have the application run on a different guest VM of node 200, or on a guest VM of a different node of the associated node cluster. By providing this capability, the node cluster is able to achieve high availability. The respective operation of HA cluster manager 220 and hypervisor 206, and the interaction therebetween to monitor and manage guest VMs 208 and 210 and applications running on the guest VMs, is described hereinafter in greater detail.

In a further embodiment of the invention, HA cluster manager 220 could be located adjacent to hypervisor 206, or could be contained therein. IN this embodiment, each of these components would function or operate as described above.

Usefully, HA cluster manager 220 comprises a component of the Tivoli System Automation Multi-Platform (TSA-MP) of the International Business Machines Corporation. However, the invention is not limited thereto. FIG. 2 also shows HA cluster manager 220 connected to interact with local filesystem components 222 and 224 of computing platform 202, through links 220b and 220c, respectively. These filesystem components are used in data transfers with guest VMs 216 and 218, respectively, as described hereinafter in further detail.

Referring further to FIG. 2, there is shown a VM channel, or internal channel 226, which extends between hypervisor 206 and an application availability manager 216 of guest VM 208. A similar internal channel 228 extends between hypervisor 206 and application availability manager 218 of guest VM 210. The internal channels 226 and 228 are each bidirectional, and are thus able to carry messages between hypervisor 206 and their respective guest VMs 208 and 210. FIG. 2 further shows channel 226 extended further to filesystem 222, and channel 228 extended further to filesystem 224. The internal channels 226 and 228 may be implemented by using a Kernel-based Virtual Machine (KVM) hypervisor, although the invention is by no means limited thereto.

Internal channel 226 comprises a pre-specified path for streaming data in two directions, between hypervisor 206 and application availability manager 208 of guest VM 208. The internal channel 226 includes a memory buffer of pre-specified capacity at each of its ends, to stream data or receive streamed data over the channel. Read messages and write messages could be sent by using an API that creates and uses parts for communication over the internal channel. Ports could be created at the hypervisor and also at application availability manager 216.

Internal channel 228 is similar or identical to internal channel 226, except that internal channel 228 extends between hypervisor 206 and application availability manager 218.

By providing channels 226 and 228 as described above and in accordance with embodiments of the invention, HA cluster manager 220 acting through hypervisor 206, is given enhanced capability to manage and control applications running on guest VMs 208 and 210. For example, hypervisor 206 is able to send commands through internal channel 226 to the kernel of guest VM 208, and more particularly to application availability manager 216 thereof. These commands include start, stop and status inquiry commands that pertain to an application 212. In response to these commands, response codes are sent from manager 216 of guest VM 208 back to hypervisor 206. Thus, to hypervisor 206 is able to directly control operation of application 212, when such application is running on guest VM 208.

Moreover, to hypervisor 206 can send messages through internal channel 226 to availability manager 216, which request the status or availability of application 212 running on guest VM 208. Status information provided by availability manager 216 through the internal channel 226 could include error messages logged by the manager 216, performance information for the application 212 and warning messages such as limited memory capacity. Status information could further include notification that a threshold has been crossed, which pertains to a pre-specified rule associated with application 212. By monitoring the responses to these requests and other messages sent from application availability manager 216 of guest VM 208, through internal channel 226, failures can be detected which have occurred in the running application 212 or in guest VM 208. Upon detecting one of such failures, corrective action can be taken. Thus, by providing the application availability manager 216 together with the internal channel as described, applications within VM 208 can be managed and monitored.

The HA cluster manager 220, through the link 220a or the like, is able to obtain state information from the hypervisor 206 in regard to application availability and hardware devices in both guest VM 208 and 210, This includes availability manager 216 and 218. In response to accumulating such state information, cluster manager 220 is able to make decisions based on pre-specified rules, for executing commands to hypervisor 206. Such commands could be executed by running scripts or the like. Accordingly, if a failure was detected in running application 212, as described above, HA cluster manager 220 could direct hypervisor 206 to start, stop and then restart application 212 on the same guest VM 208. This action could be readily carried out by sending an appropriate sequence of commands from hypervisor 206 to VM 208, through internal channel 226.

As an alternative corrective action, application 212 could be stopped, and then restarted to run on a different guest VM of node 200, e.g., guest VM 210. As a further corrective action, application 212 could be stopped, and then restarted to run on a guest VM that was located on a node of node cluster 100 other than node 200. The guest VM could be either guest VM 208, or a different guest VM. As is known by those of skill in the art, and also as used herein, actions of the above types are referred to as "failover" and "implementing failover".

It will be appreciated that the above description of the functions and operations of guest VM 208, application 212, manager 216 and internal channel 226 also apply, respectively, to guest VM 210, application 214, manager 218 and internal channel 228.

When an application is running on a guest VM of the type shown in FIG. 2, data generated by and associated with such activity must be kept track of. This is necessary to ensure that such data is available, in the event that failover as described above occurs, either to a different node, or to a different guest VM of the same node. In order to achieve this, replication software is distributed over each of the nodes of node cluster 100 described above. Also, as shown by FIG. 2, guest VMs 208 and 210 are provided with I/O emulators 230 and 232, respectively. Each of the emulators enables data to be received by and sent from its corresponding guest VM. An I/O Device Requests component 234 is associated with emulator 230, and is connected to internal channel 226. Component 234 is responsive to commands sent through internal channel 226, to cause data to be selectively exchanged between guest VM 208 and filesystem 222 of computing platform 202. A similar I/O Device Requests component 236 is associated with I/O emulator 232 and is connected to internal channel 228.

When an application 212 is running on guest VM 208, a component such as component 234 functions as a replication sender. That is, it causes incoming data and other data associated with the running application 212 to be replicated and stored, such as by filesystem 222 or the like. During this time, a component such as component 236 of guest VM 210 functions as a replication receiver. The replication receiver is adapted to receive or keep track of data that has been replicated by the replication sender. Then, if a failure as described above occurs, application 212 may be stopped on guest VM 208 and started on guest VM 210. If this occurs, a command is sent to component 236 through internal channel 228, from manager 220, wherein the command directs component 236 to perform the function of replication sender rather than replication receiver. Component 234 is similarly instructed to perform the function of replication receiver. Data replicated by replicating sender 236 may then be routed for storage. Alternatively, in the case of the enqueue replication service (ENQREP) of SAP AG, the replicated data is kept in memory. If the SAP enqueue service (ENQ) dies and is restarted on the ENQREP's guest, it retrieves its data by memory to memory transfer, which is faster than any storage access.

By providing the VM or internal channel in the configuration of FIG. 2 as described above, embodiments of the invention provide users thereof with a further important benefit. More specifically, HA cluster manager 220 may be a component of a high availability cluster management product that is potentially quite complex. For example, such product may include complex management scripts and resource configurations. However, in the embodiment of FIG. 2, such scripts and configurations are all contained in the hypervisor 206, as illustrated by component 238. As a result, those who use the embodiment of FIG. 2 to run their applications, on guest VMs 208 and 210 or the like, do not need to learn or become familiar with all the scripts and resources of the cluster management product.

Figure 3:
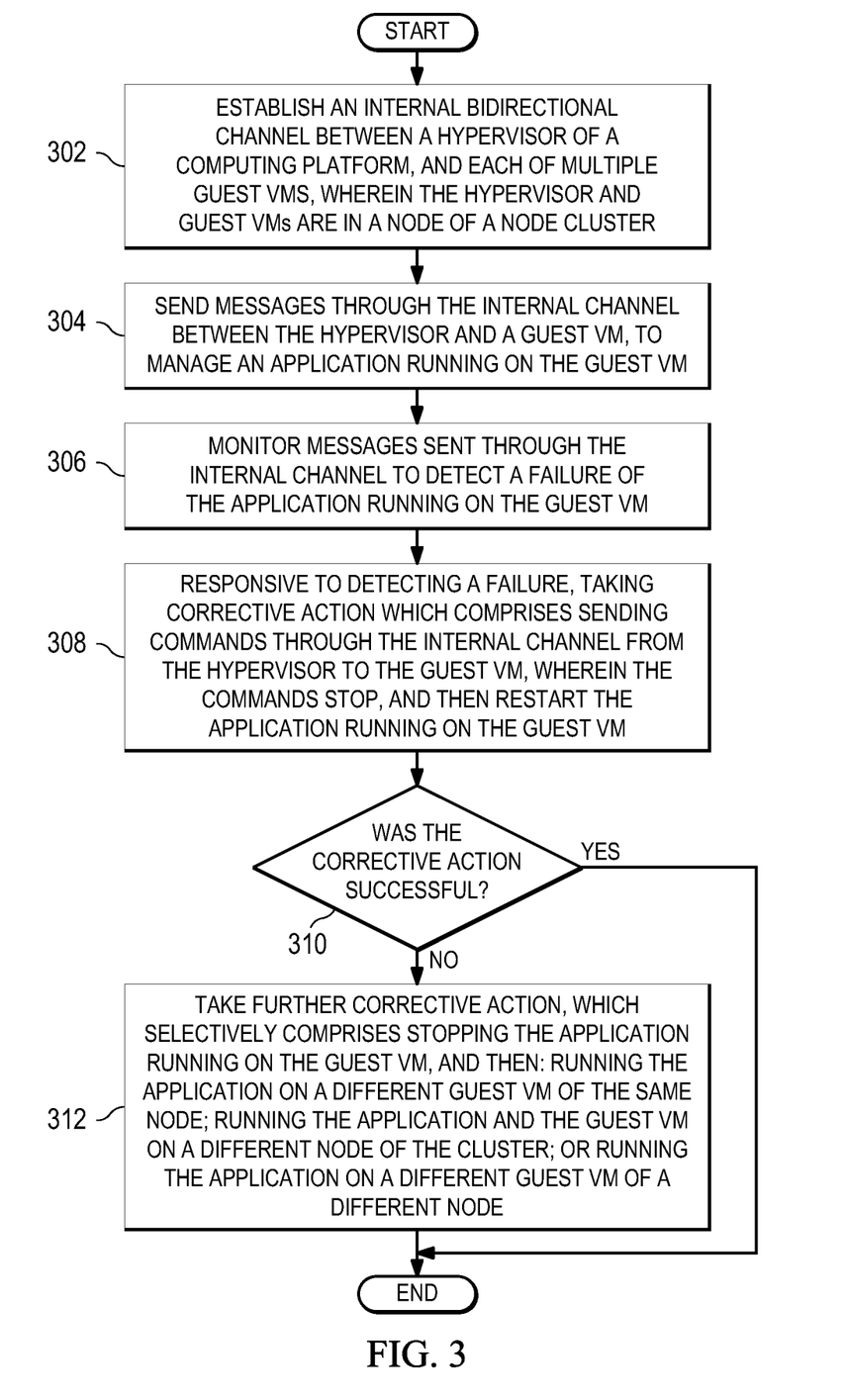
FIG. 3 is a flow chart showing steps of a method comprising an embodiment of the invention.

Referring to FIG. 3, shown are steps of a method comprising an embodiment of the invention. At step 302, an internal bidirectional channel is established between a hypervisor of a computing platform and each of multiple guest VMs, wherein the hypervisor and guest VMs are included in a node of a node cluster. At step 304, messages are sent through the internal channel between the hypervisor and one of the guest VMs to manage an application running on the guest VM. Step 306 discloses monitoring messages sent through the internal channel, in order to detect a failure of the application running on the guest VM.

In response to detecting a failure, corrective action is taken which comprises sending commands through the internal channel from the hypervisor to the guest VM, wherein the commands stop, and then restart the application running on the guest VM. In accordance with decision step 310, if the corrective action of step 308 is successful, so that the detected failure is overcome, the method of FIG. 3 ends. Otherwise, the method proceeds to step 312.

At step 312, one of several further actions is selected. Each of these initially includes stopping the application running on the guest VM, which is usefully carried out by sending a stop command from the hypervisor to the guest VM through the internal channel. The further actions then respectively comprise running the application on a different guest VM of the same node; running the application and the guest VM on a different node of the cluster; and running the application on a different guest VM of a different node. After taking one of these actions, the method of FIG. 3 ends.

Figure 4:
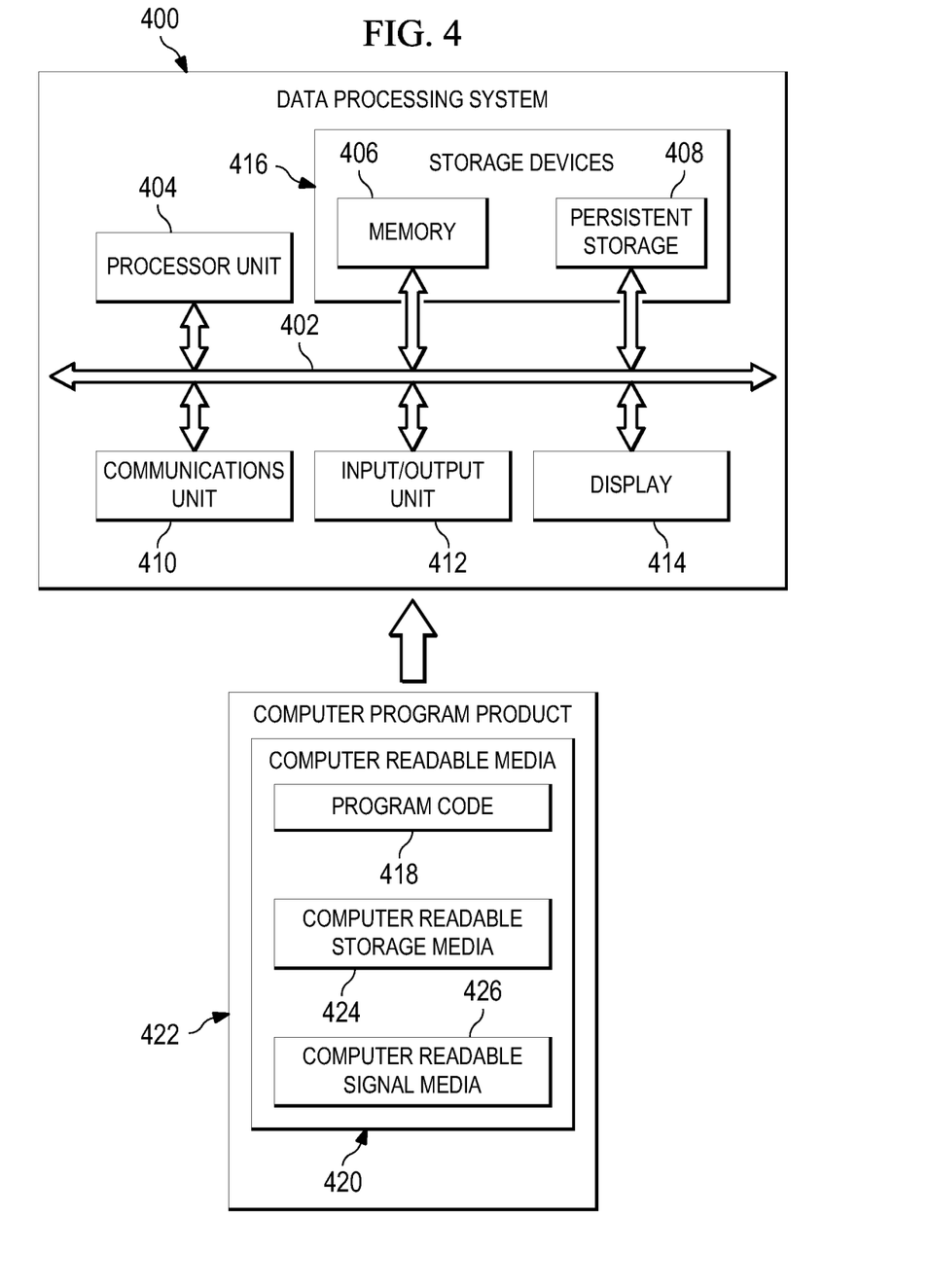
FIG. 4 is a block diagram showing a computer or data processing system that may be used as one or more of the components of an embodiment of the invention.

FIG. 4 is a block diagram that shows a data processing system in accordance with an illustrative embodiment. Data processing system 400 is an example of a computer, which may be used to implement one or more components of embodiments of the invention, and in which computer usable program code or instructions implementing the related processes may be located for the illustrative embodiments. In this illustrative example, data processing system 400 includes communications fabric 402, which provides communications between processor unit 404, memory 406, persistent storage 408, communications unit 410, input/output (I/O) unit 412, and display 414.

Processor unit 404 serves to execute instructions for software that may be loaded into memory 406. Processor unit 404 may be a set of one or more processors or may be a multi-processor core, depending on the particular implementation. Further, processor unit 404 may be implemented using one or more heterogeneous processor systems, in which a main processor is present with secondary processors on a single chip. As another illustrative example, processor unit 404 may be a symmetric multi-processor system containing multiple processors of the same type.

Memory 406 and persistent storage 408 are examples of storage devices 416. A storage device is any piece of hardware that is capable of storing information, such as, for example, without limitation, data, program code in functional form, and/or other suitable information either on a temporary basis and/or a permanent basis. Memory 406, in these examples, may be, for example, a random access memory, or any other suitable volatile or non-volatile storage device. Persistent storage 408 may take various forms, depending on the particular implementation. For example, persistent storage 408 may contain one or more components or devices. For example, persistent storage 408 may be a hard drive, a flash memory, a rewritable optical disk, a rewritable magnetic tape, or some combination of the above. The media used by persistent storage 408 may be removable. For example, a removable hard drive may be used for persistent storage 408.

Communications unit 410, in these examples, provides for communication with other data processing systems or devices. In these examples, communications unit 410 is a network interface card. Communications unit 410 may provide communications through the use of either or both physical and wireless communications links.

Input/output unit 412 allows for the input and output of data with other devices that may be connected to data processing system 400. For example, input/output unit 412 may provide a connection for user input through a keyboard, a mouse, and/or some other suitable input device. Further, input/output unit 412 may send output to a printer. Display 414 provides a mechanism to display information to a user.

Instructions for the operating system, applications, and/or programs may be located in storage devices 416, which are in communication with processor unit 404 through communications fabric 402. In these illustrative examples, the instructions are in a functional form on persistent storage 408. These instructions may be loaded into memory 406 for execution by processor unit 404. The processes of the different embodiments may be performed by processor unit 404 using computer implemented instructions, which may be located in a memory, such as memory 406.

These instructions are referred to as program code, computer usable program code, or computer readable program code that may be read and executed by a processor in processor unit 404. The program code, in the different embodiments, may be embodied on different physical or computer readable storage media, such as memory 406 or persistent storage 408.

Program code 418 is located in a functional form on computer readable media 420 that is selectively removable and may be loaded onto or transferred to data processing system 400 for execution by processor unit 404. Program code 418 and computer readable media 420 form computer program product 422. In one example, computer readable media 420 may be computer readable storage media 424 or computer readable signal media 426. Computer readable storage media 424 may include, for example, an optical or magnetic disc that is inserted or placed into a drive or other device that is part of persistent storage 408 for transfer onto a storage device, such as a hard drive, that is part of persistent storage 408. Computer readable storage media 424 also may take the form of a persistent storage, such as a hard drive, a thumb drive, or a flash memory that is connected to data processing system 400. In some instances, computer readable storage media 424 may not be removable from data processing system 400.

Alternatively, program code 418 may be transferred to data processing system 400 using computer readable signal media 426. Computer readable signal media 426 may be, for example, a propagated data signal containing program code 418. For example, computer readable signal media 426 may be an electromagnetic signal, an optical signal, and/or any other suitable type of signal. These signals may be transmitted over communications links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communications links or wireless transmissions containing the program code.

In some illustrative embodiments, program code 418 may be downloaded over a network to persistent storage 408 from another device or data processing system through computer readable signal media 426 for use within data processing system 400. For instance, program code stored in a computer readable storage media in a server data processing system may be downloaded over a network from the server to data processing system 400. The data processing system providing program code 418 may be a server computer, a client computer, or some other device capable of storing and transmitting program code 418.

The different components illustrated for data processing system 400 are not meant to provide physical or architectural limitations to the manner in which different embodiments may be implemented. The different illustrative embodiments may be implemented in a data processing system including components in addition to and/or in place of those illustrated for data processing system 400. Other components shown in FIG. 4 can be varied from the illustrative examples shown. The different embodiments may be implemented using any hardware device or system capable of executing program code. As one example, data processing system 400 may include organic components integrated with inorganic components and/or may be comprised entirely of organic components excluding a human being. For example, a storage device may be comprised of an organic semiconductor.

As another example, a storage device in data processing system 400 is any hardware apparatus that may store data. Memory 406, persistent storage 408, and computer readable media 420 are examples of storage devices in a tangible form.

In another example, a bus system may be used to implement communications fabric 402 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 406 or a cache such as found in an interface and memory controller hub that may be present in communications fabric 402.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. In association with a first node comprising a hypervisor and one or more guest virtual machines (VMs), wherein each guest VM is configured to run one or more applications, and the first node is joined with one or more other nodes to form a high availability (HA) cluster, wherein the first node is configured to run a local HA manager that is external to the each guest VM, a computer program product executable in a non-transitory recordable storage medium comprising:
    instructions for establishing an internal bidirectional communications channel between each guest VM and the hypervisor of said first node;
    instructions for sending messages that include commands and responses to commands through the internal channel, between the hypervisor and a given guest VM as directed by the local HA manager, wherein respective commands are sent to manage a specified application running on the given guest VM;
    instructions for selectively monitoring said messages, to detect an occurrence of a failure condition associated with the specified application running on the given guest VM; and
    instructions responsive to detecting a failure condition, for taking action to correct the failure condition as directed by the local HA manager, wherein said action includes sending at least one command through the internal channel from the hypervisor to the given guest VM, wherein notification of guest VM failures in the first node are sent to the local HA manager that is configured to manage the hypervisor of the first node and interact with a filesystem associated with the specified application.

2. The computer program product of claim 1, wherein:
    each of the internal bidirectional channels is established between an application availability manager associated with one of the guest VMs, and the hypervisor of said first node.

3. The computer program product of claim 1, wherein:
    said action to correct comprises, selectively, either sending a sequence of commands through the internal channel, from the hypervisor to the given guest VM as directed by the local HA manager, to stop the specified application running on the given guest VM, and to then restart the specified application on the given guest VM and in the first node, or implementing failover of the specified application to a guest VM of the first node other than the given guest VM as directed by the local HA manager, and running the specified application on said other guest VM.

4. The computer program product of claim 3, wherein:
prior to a failover of the specified application to said other guest VM, a specified component of said other guest VM is operated as a replication receiver, and after a failover of the specified application to said other guest VM, and responsive to a command sent through the internal channel from the hypervisor to said other guest VM, the specified component of said other guest VM is operated as a replication sender, wherein the replication sender replicates data generated by the specified application to the filesystem prior to the failure, and wherein the replication receiver manages the data replicated by the replication sender prior to the failure.

5. The computer program product of claim 4, wherein:
after a failover of the specified application to said other guest VM, incoming data is routed to said other guest VM, and is replicated by the replication sender to storage associated with said other guest VM, and a specified component of the given guest VM is operated as a replication receiver.

6. The computer program product of claim 1, wherein:
said action to correct comprises implementing failover of the specified application and the given guest VM to a second node of the HA cluster, and running the specified application on the given guest VM in the second node.

7. The computer program product of claim 1, wherein:
said action to correct comprises implementing failover of the specified application to a second node of the HA cluster, and running the specified application on a guest VM other than the given guest VM, in the second node.

8. The computer program product of claim 1, wherein:
the HA cluster is provided with a system for monitoring heartbeats produced by respective nodes of the HA cluster, wherein failure of a node is indicated by a deficiency of the heartbeats produced thereby.

9. The computer program product of claim 1, wherein the local HA manager is configured to initiate a transfer of data generated by the specified application between two or more guest VMs of the first node.

10. The computer program product of claim 1, wherein each node of the of the HA cluster has a corresponding local HA manager that is configured to manage a corresponding hypervisor of a corresponding node of the HA cluster, and wherein each local HA manager is configured to interact with at least one local filesystem component of a corresponding node of the HA cluster and transfer data generated by a corresponding specified application between two or more guest VMs of the corresponding node.

11. In association with a first node comprising a hypervisor and one or more guest virtual machines (VMs), wherein each guest VM is configured to run one or more applications, and the first node is joined with one or more other nodes to form a high availability (HA) cluster, wherein the first node is configured to run an HA cluster manager that is external to the each guest VM, a computer program product executable in a non-transitory recordable storage medium comprising:
instructions for establishing an internal bidirectional communications channel between each guest VM and the hypervisor of said first node;
instructions for sending messages that include commands and responses to commands through the internal channel, between the hypervisor and a given guest VM as directed by the HA cluster manager, wherein respective commands are sent to manage a specified application running on the given guest VM;
instructions for selectively monitoring said messages, to detect an occurrence of a failure condition associated with the specified application running on the given guest VM; and
instructions responsive to detecting a failure condition, for taking action to correct the failure condition as directed by the HA cluster manager, wherein said action includes sending at least one command through the internal channel from the hypervisor to the given guest VM, wherein guest VM failures in the first node are detected by the HA cluster manager that is configured to manage the hypervisor of the first node, wherein the specified application running on the given guest VM is managed by the HA cluster manager that is associated with the hypervisor and configured to detect the failed condition, wherein the HA cluster manager requires specified management scripts to manage the specified application, and all of said specified management scripts are contained in the hypervisor.

12. In association with a first node comprising a hypervisor and one or more guest virtual machines (VMs), wherein each guest VM is configured to run one or more applications, and the first node is joined with one or more other nodes to form a high availability (HA) cluster, wherein the first node is configured to run a local HA manager that is external to the each guest VM, the apparatus comprising:
a data processor coupled to a storage device having instructions stored therein that are configured to perform, when executed by the data processor, steps of:
establishing an internal bidirectional communications channel between each guest VM and the hypervisor of said first node;
sending messages that include commands and responses to commands through the internal channel, between the hypervisor and a given guest VM as directed by the local HA manager, wherein respective commands are sent to manage a specified application running on the given guest VM;
selectively monitoring said messages, to detect an occurrence of a failure condition associated with the specified application running on the given guest VM; and
responsive to detecting a failure condition, taking action to correct the failure condition as directed by the local HA manager, wherein said action includes sending at least one command through the internal channel from the hypervisor to the given guest VM, wherein notification of guest VM failures in the first node are sent to the local HA manager that is configured to manage the hypervisor of the first node and interact with a filesystem associated with the specified application.

13. The apparatus of claim 12, wherein:
each of the internal bidirectional channels is established between an application availability manager associated with one of the guest VMs, and the hypervisor of said first node.

14. The apparatus of claim 12, wherein:
said action to correct comprises sending, selectively, either a sequence of commands through the internal channel, from the hypervisor to the given guest VM as directed by the local HA manager, to stop the specified application running on the given guest VM, and to then restart the specified application on the given guest VM and in the first node, or implementing failover of the specified application to a guest VM of the first node other than the given guest VM as directed by the local HA manager, and running the specified application on said other guest VM.

15. The apparatus of claim 14, wherein:
prior to a failover of the specified application to said other guest VM, a specified component of said other guest VM is operated as a replication receiver, and after a failover of the specified application to said other guest VM, and responsive to a command sent through the internal channel from the hypervisor to said other guest VM, the specified component of said other guest VM is operated as a replication sender, wherein the replication sender replicates data generated by the specified application to the filesystem prior to the failure, and wherein the replication receiver manages the data replicated by the replication sender prior to the failure.

16. The apparatus of claim 15, wherein:
after a failover of the specified application to said other guest VM, incoming data is routed to said other guest VM, and is replicated by the replication sender to storage associated with said other guest VM, and a specified component of the given guest VM is operated as a replication receiver.

17. The apparatus of claim 12, wherein:
said action to correct comprises implementing failover of the specified application and the given guest VM to a second node of the HA cluster, and running the specified application on the given guest VM in the second node.

18. The apparatus of claim 12, wherein:
said action to correct comprises implementing failover of the specified application to a second node of the HA cluster, and running the specified application on a guest VM other than the given guest VM, in the second node.

19. The apparatus of claim 12, wherein:
the HA cluster is provided with a system for monitoring heartbeats produced by respective nodes of the HA cluster, wherein failure of a node is indicated by a deficiency of the heartbeats produced thereby.

20. In association with a first node comprising a hypervisor and one or more guest virtual machines (VMs), wherein each guest VM is configured to run one or more applications, and the first node is joined with one or more other nodes to form a high availability (HA) cluster, wherein the first node is configured to run an HA cluster manager that is external to the each guest VM, the apparatus comprising:
a data processor coupled to a storage device having instructions stored therein that are configured to perform, when executed by the data processor, steps of:
establishing an internal bidirectional communications channel between each guest VM and the hypervisor of said first node;
sending messages that include commands and responses to commands through the internal channel, between the hypervisor and a given guest VM as directed by the HA cluster manager, wherein respective commands are sent to manage a specified application running on the given guest VM;
selectively monitoring said messages, to detect an occurrence of a failure condition associated with the specified application running on the given guest VM; and
responsive to detecting a failure condition, taking action to correct the failure condition as directed by the HA cluster manager, wherein said action includes sending at least one command through the internal channel from the hypervisor to the given guest VM, wherein guest VM failures in the first node are detected by the HA cluster manager that is configured to manage the hypervisor of the first node, wherein the specified application running on the given guest VM is managed by the HA cluster manager that is associated with the hypervisor and configured to detect the failed condition, wherein the HA cluster manager requires specified management scripts, and all of said specified management scripts are contained in the hypervisor.

21. In association with a first node comprising a hypervisor and one or more guest virtual machines (VMs), wherein each guest VM is configured to run one or more applications, and the first node is joined with one or more other nodes to form a high availability (HA) cluster, wherein the first node is configured to run a local HA manager that is external to the each guest VM, a method comprising the steps of:
establishing an internal bidirectional communications channel between each guest VM and the hypervisor of said first node;
sending messages that include commands and responses to commands through the internal channel, between the hypervisor and a given guest VM, wherein respective commands are sent to manage a specified application running on the given guest VM;
selectively monitoring said messages, to detect an occurrence of a failure condition associated with the specified application running on the given guest VM; and
responsive to detecting a failure condition, taking action to correct the failure condition, wherein said action includes sending at least one command through the internal channel from the hypervisor to the given guest VM, wherein guest VM failures in the first node are detected by the local HA manager that is configured to manage the hypervisor of the first node.

22. The method of claim 21, wherein:
each of the internal bidirectional channels is established between an application availability manager associated with one of the guest VMs, and the hypervisor of said first node.

23. The method of claim 21, wherein:
said action to correct comprises, selectively, either sending a sequence of commands through the internal channel, from the hypervisor to the given guest VM, to stop the specified application running on the given guest VM, and to then restart the specified application on the given guest VM and in the first node or implementing failover of the specified application to a guest VM of the first node other than the given guest VM, and running the specified application on said other guest VM.

24. The method of claim 23, wherein:
prior to a failover to said other guest VM, a specified component of said other guest VM is operated as a replication receiver, and after a failover to said other guest VM, and responsive to a command sent through the internal channel from the hypervisor to said other guest VM, the specified component of said other guest VM is operated as a replication sender, wherein the replication sender replicates data associated with a running application to a local filesystem, and wherein the replication receiver manages the data replicated by the replication sender.

25. The method of claim 24, wherein:
after a failover to said other guest VM, incoming data is routed to said other guest VM, and is replicated by the replication sender to storage associated with said other guest VM, and a specified component of the given guest VM is operated as a replication receiver.

26. The method of claim 21, wherein:
said action to correct comprises implementing failover of the specified application and the given guest VM to a second node of the HA cluster, and running the specified application on the given guest VM in the second node.

27. The method of claim 21, wherein:
said action to correct comprises implementing failover of the specified application to a second node of the HA cluster, and running the specified application on a guest VM other than the given guest VM, in the second node.

28. The method of claim 21, wherein:
the HA cluster is provided with a system for monitoring heartbeats produced by respective nodes of the HA cluster, wherein failure of a node is indicated by a deficiency of the heartbeats produced thereby.

29. The method of claim 21, wherein the local HA manager is configured to interact with at least one local filesystem component of the first node of the HA cluster and transfer data between two or more guest VMs of the first node.

30. The method of claim 21, wherein each node of the of the HA cluster has a corresponding local HA manager that is configured to manage a corresponding hypervisor of a corresponding node of the HA cluster, and wherein each local HA manager is configured to interact with at least one local filesystem component of a corresponding node of the HA cluster and transfer data between two or more guest VMs of the corresponding node.

31. In association with a first node comprising a hypervisor and one or more guest virtual machines (VMs), wherein each guest VM is disposed to run one or more applications, and the first node is joined with one or more other nodes to form a high availability (HA) cluster, a method comprising the steps of:

establishing an internal bidirectional communications channel between each guest VM and the hypervisor of said first node;

sending messages that include commands and responses to commands through the internal channel, between the hypervisor and a given guest VM, wherein respective commands are sent to manage a specified application running on the given guest VM;

selectively monitoring said messages, to detect an occurrence of a failure condition associated with the specified application running on the given guest VM; and responsive to detecting a failure condition, taking action to correct the failure condition, wherein said action includes sending at least one command through the internal channel from the hypervisor to the given guest VM, wherein the specified application running on the given guest VM is managed by an HA cluster manager associated with the hypervisor and configured to detect a failure of the specified application, wherein the HA cluster manager requires specified management scripts and configuration resources for its operation, and all of said management scripts and configuration resources are contained in the hypervisor.

\* \* \* \* \*